(12) United States Patent
Chang

(10) Patent No.: US 7,267,470 B2
(45) Date of Patent: Sep. 11, 2007

(54) BACKLIGHT MODULE HAVING AN OPTICAL SWITCH ELEMENT

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 260 days.

(21) Appl. No.: 11/061,347

(22) Filed: Feb. 18, 2005

(65) Prior Publication Data

US 2006/0050535 A1    Mar. 9, 2006

(30) Foreign Application Priority Data

Apr. 9, 2004    (TW) .............................. 93109878 A

(51) Int. Cl.
*F21V 7/04* (2006.01)
(52) U.S. Cl. ...................... 362/621; 362/609
(58) Field of Classification Search ................ 362/608, 362/609, 621, 623, 632
See application file for complete search history.

(56) References Cited

U.S. PATENT DOCUMENTS 2,480,178 A * 8/1949 Zinberg ...................... 362/621
6,254,245 B1 * 7/2001 Uehara ........................ 362/609
6,979,115 B2 * 12/2005 Ohizumi et al. ............ 362/634

* cited by examiner

*Primary Examiner*—John Anthony Ward
(74) *Attorney, Agent, or Firm*—Morris Manning & Martin LLP; Tim Tingkang Xia, Esq.

(57) ABSTRACT

An exemplary backlight module (2) includes: a light guide plate (21) having an incident surface (211); a light source (23) facing toward the incident surface; a light source cover (25) partially covering the light source, a wall of the light source cover defining an opening located between the light source and the incident surface; and an optical switch element disposed between the light source and the incident surface and adjacent to the incident surface, and configured for adjusting the amount of light beams emitted by the light source that transmit through each of the opening and the incident surface. The optical switch element can control the light beams to pass through the opening in order to provide illumination for taking of photos. Moreover, the backlight module can also be used as a backlight source to supply bright light for a display screen of a display device.

19 Claims, 2 Drawing Sheets

BACKLIGHT MODULE HAVING AN OPTICAL SWITCH ELEMENT

BACKGROUND OF THE INVENTION

1. Field of the Invention

The present invention relates to backlight modules, and especially to a backlight module with a switch element used in digital products such as liquid crystal display (LCD) devices and the like.

2. Description of the Prior Art

Liquid crystal displays (LCD) are now in widespread use in various applications; for example, in desktop computers, portable computers, LCD televisions, portable telephones, etc. An LCD cannot emit light itself. A light source system such as a backlight system is needed for emission of light. A light guide plate is an important part of a backlight system, because it controls uniform directionality of emitted light.

A conventional backlight module is shown in FIG. 5. The backlight module 1 comprises a light source 11, a light source cover 16, a reflection plate 12, a light guide plate 13, a diffusion plate 14, and a brightness enhancement film (BEF) 15.

The reflection plate 12, light guide plate 13, diffusion plate 14 and BEF 15 are stacked sequentially from bottom to top. The light guide plate 13 is flat, and includes an incident surface 131, a bottom surface 133 substantially perpendicular to the incident surface 131, and an emitting surface 132 opposite to the bottom surface 133. The light source 11 is arranged adjacent to the incident surface 131, and the light source cover 16 essentially covers three sides of the light source 11. The BEF 15 has a plurality of parallel prism sections 151.

Light beams emitted by the light source 11 enter the light guide plate 13 through the incident surface 131 and propagate through the light guide plate 13. The light guide plate 13 cooperates with the reflection plate 12 to guide the light beams to emit out from the emitting surface 132. Then the light beams are diffused by the diffusion plate 14, and are focused by the prism sections 151 to supply bright light for an associated display screen.

In recent years, the development of liquid crystal display devices has paralleled the development of digital products, particularly digital products which have photography functionality such as mobile communications devices and digital video. To enable photography and filming, these products generally need an amount of artificial light like a flash in low light conditions. However, conventional backlight modules are not equipped to meet this requirement.

Therefore, it is desired to provide a backlight module which overcomes the above-described shortcoming of the prior art.

SUMMARY OF THE INVENTION

An object of the present invention is to provide a backlight module which can supply illumination for purposes in addition to the illumination of a display screen.

To achieve the above-described object, an exemplary backlight module of the present invention includes: a light guide plate having an incident surface; a light source facing toward the incident surface; a light source cover partially covering the light source, a wall of the light source cover defining an opening (i.e., generally a kind of light transmissive portion) located between the light source and the incident surface; and an optical switch element disposed between the light source and the incident surface and adjacent to the incident surface, and configured for adjusting the amount of light beams emitted by the light source that transmit through each of the opening and the incident surface.

According to the present invention, the light source cover of the backlight module has the opening, and the rotation device and the reflection plate control light beams emitted by the light source to transmit through the opening and/or into the light guide plate. The reflection plate can control the light beams to pass through the opening in order to provide a flash illumination for taking of photos. Moreover, the backlight module can also be used as a backlight source to supply bright light for a display screen of a display device.

Other objects, advantages, and novel features of the present invention will be apparent from the following detailed description of preferred embodiments thereof with reference to the attached drawings.

DETAILED DESCRIPTION OF THE PRESENT INVENTION

Figure 1:
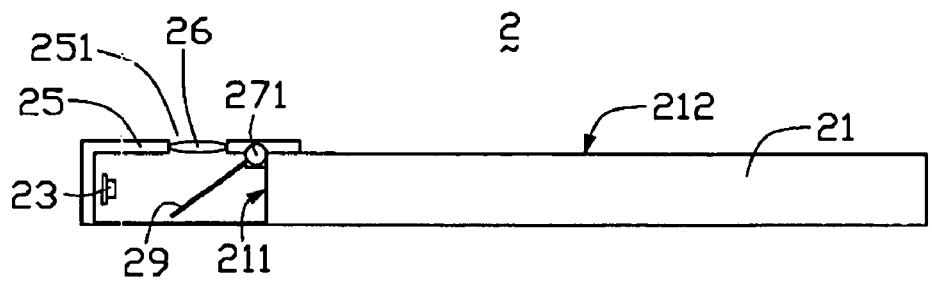
FIG. 1 is a schematic, side view of a backlight module of the present invention.
Figure 2:
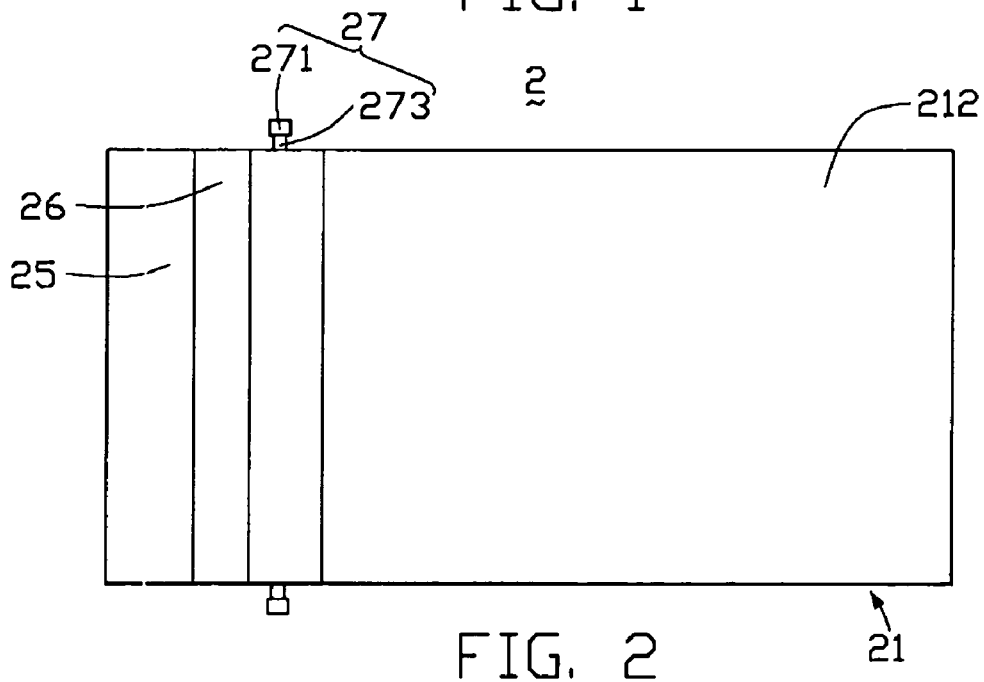
FIG. 2 is a top side view of the backlight module of FIG. 1.

Referring to FIG. 1 and FIG. 2, these respectively show schematic side and top views of a backlight module 2 of the present invention. The backlight module 2 includes a light guide plate 21, a light source 23, a light source cover 25, a rotation device 27, and a reflection plate 29 as a light reflector.

The light guide plate 21 has an incident surface 211 and an emitting surface 212 substantially perpendicular to the incident surface 211. The light source 23 faces the incident surface 211, and light beams emitted by the light source 23 pass through the incident surface 211 and transmit inside the light guide plate 21. The light source 23 can be a linear light source or a point light source.

The light source cover 25 has a U-shaped profile, and essentially covers three sides of the light source 23. An inside surface of the light source cover 25 is a totally reflective surface. An end portion of the light source cover 25 is supported on an end portion of the emitting surface 212. The rotation device 27 is positioned adjacent to the incident surface 211, close to the emitting surface 212. The light source cover 25 has an elongated opening 251 parallel to the emitting surface 212, and a lens 26 of a flash module is arranged in the opening 251. The opening 251 is spatially located between the light source 23 and the incident surface 211. The rotation device 27 includes a control knob 271 and a rotation axle 273. The control knob 271 can be manually turned in order to rotate the rotation axle 273. The reflection plate 29 is fixed on the rotation axle 273 and located between the light source 23 and the incident surface 211, and is driven to rotate by the rotation axle 273. The reflection plate 29 can be a totally reflective plate or a transflective plate. Accordingly, the amount of light beams emitted from the light source 23 and transmitting through each of the opening 251 and the incident surface 211 is adjustable by way of rotating the reflection plate 29.

Figure 3:
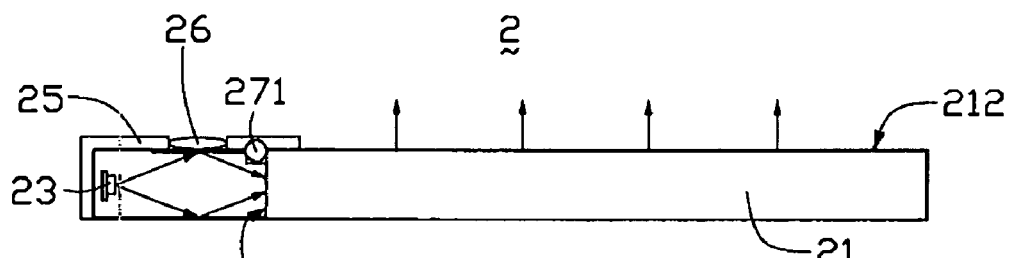
FIG. 3 is a similar to FIG. 1, but showing the backlight module in operation in a first state.

FIG. 3 is a view of the backlight module 2 in operation in a first state, in which the backlight module 2 supplies light beams for a display screen of an associated display device such as an LCD device. To obtain the first state, the control knob 271 is turned so that the reflection plate 29 rotates upwardly and completely covers the opening 251. The light beams emitted by the light source 23 are reflected by the reflection plate 29 and the inside surface of the light source cover 25. Then the light beams enter and propagate within the light guide plate 21, and emit out from the emitting surface 212 to supply bright, even light for the display screen.

Figure 4:
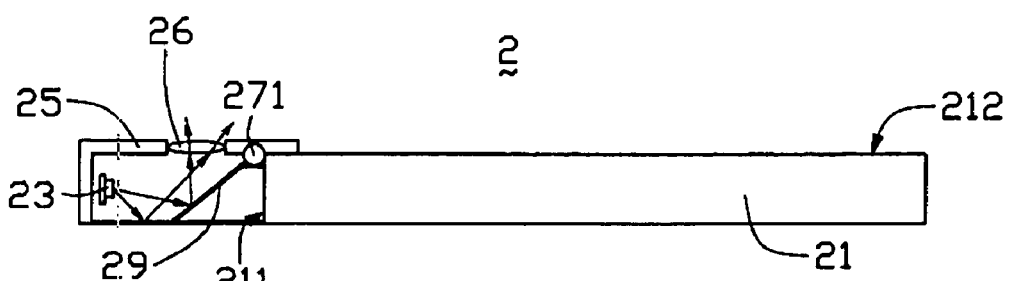
FIG. 4 is similar to FIG. 3, but showing the backlight module in operation in a second state.
Figure 5:
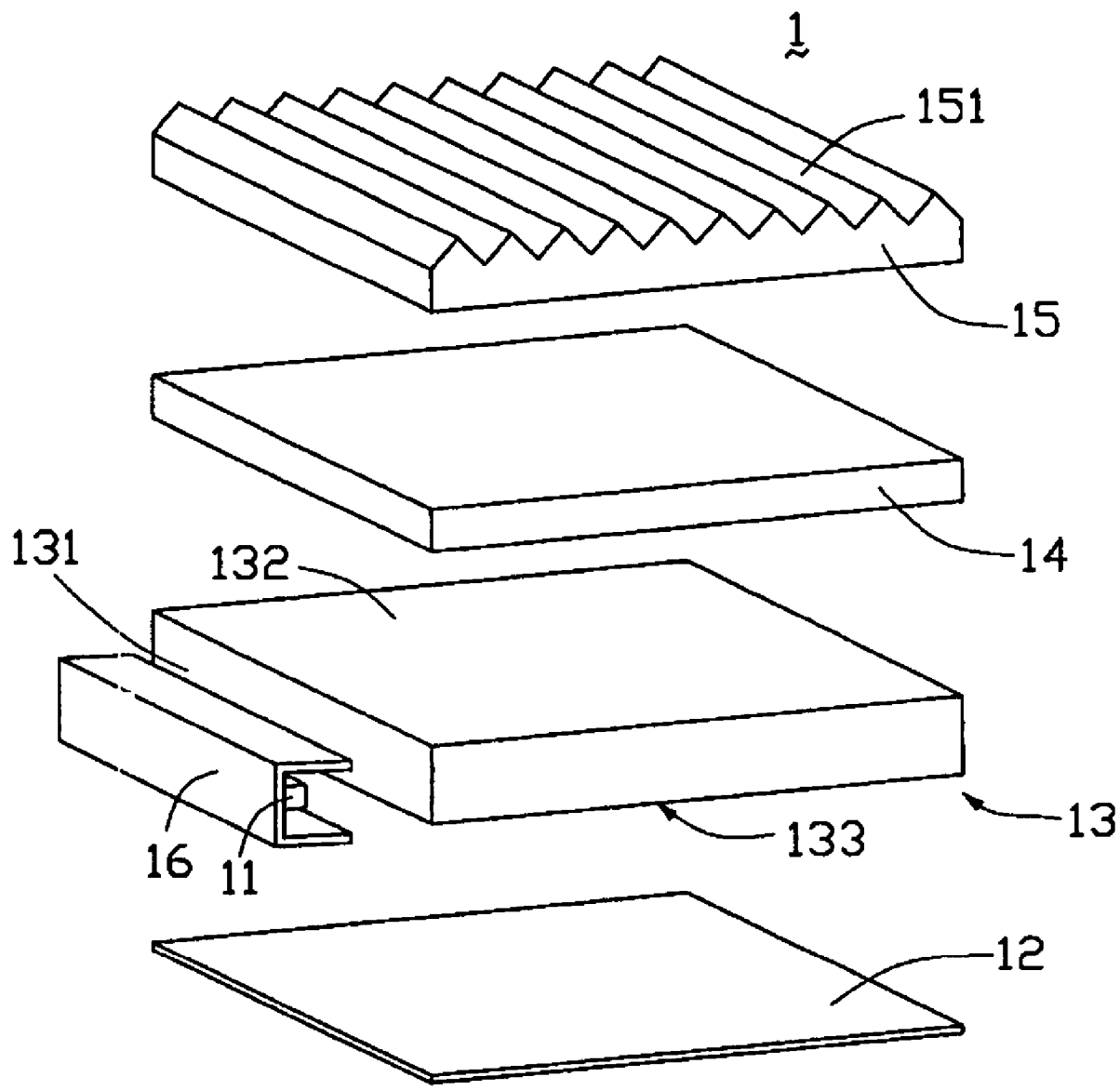
FIG. 5 is an exploded, isometric view of a conventional backlight module.

FIG. 4 is similar to FIG. 3, but showing the backlight module 2 in operation in a second state, in which the backlight module 2 supplies light beams for facilitating an associated digital camera module to take a photo in low light conditions. To obtain the second state, the control knob 271 is turned so that the reflection plate 29 rotates down away from the opening 251 to a position where it obliquely abuts the light source cover 25. In this position, the reflection plate 29 forms a certain angle with respect to the opening 251. The light beams emitted by the light source 23 are reflected by the reflection plate 29 and emitted out through the lens 26. The light beams illuminate an object to be photographed as a flash, with the lens 26 enhancing the brightness of the light beams. The digital camera module can thus take a good quality photo. Further, the reflection plate 29 can be rotated to any angle with respect to the opening 251 in order to optimize the illumination of the object.

Moreover, the reflection plate 29 can be a transflective plate-like member. With this configuration, in the second state, some light beams are reflected to illuminate the object, and other light beams pass through the reflection plate 29, enter the light guide plate 21, and supply even light for the display screen of the LCD device.

In summary, according to the present invention, the light source cover 25 of the backlight module 2 has the opening 251, and the rotation device 27 and the reflection plate 29 control light beams emitted by the light source 23 to transmit through the opening 251 and/or into the light guide plate 21. The reflection plate 29 can control the light beams to pass through the opening 251 in order to provide illumination for taking of photos. Moreover, the backlight module 2 can also be used as a backlight source to supply bright light for a display screen of a display system.

Meanwhile, based on the present invention, other handheld integrated devices including the backlight module 2 are able to designed same to use the light beams emitted by the light source 23 for other functional modules integrated with the backlight module 2, for example, a scanner module, a handheld flashlight module and a signal-expression module.

It is to be understood, however, that even though numerous characteristics and advantages of the present invention have been set out in the foregoing description, together with details of the structure and function of the invention, the disclosure is illustrative only, and changes may be made in detail to the full extent indicated by the broad general meaning of the terms in which the appended claims are expressed.

What is claimed is:

1. A backlight module comprising:
   a light guide plate having an incident surface;
   a light source facing toward the incident surface;
   a light source cover partially covering the light source, a wall of the light source cover defining an opening located between the light source and the incident surface; and
   an optical switch element disposed between the light source and the incident surface and adjacent to the incident surface, and configured for adjusting an amount of light beams emitted by the light source that transmit through each of the opening and the incident surface.

2. The backlight module as claimed in claim 1, wherein the switch element comprises a rotation device and a reflection plate, and the rotation device can rotate the reflection plate.

3. The backlight module as claimed in claim 2, wherein the rotation device has a rotation axle.

4. The backlight module as claimed in claim 3, wherein the reflection plate is fixed on the rotation axle.

5. The backlight module as claimed in claim 1, wherein the opening contains a lens.

6. The backlight module as claimed in claim 2, wherein the reflection plate is a totally reflective plate.

7. The backlight module as claimed in claim 2, wherein the reflection plate is a transflective plate.

8. The backlight module as claimed in claim 1, wherein the light source is a linear light source.

9. The backlight module as claimed in claim 1, wherein the light source is a point light source.

10. The backlight module as claimed in claim 1, wherein an inside surface of the light source cover is a totally reflective surface.

11. An integrated device having a display system, comprising:
    a backlight module including a light source and a light guide plate cooperatively configured for providing light from said light source to said display system, said light guide plate having an incident surface that faces toward said light source and is configured for receiving said light from said light source;
    a functional module integrally disposed with said backlight module and defining a light path accessible to said light source of said backlight module so as to allow said light from said light source to transmit to said functional module in order to enable said functional module; and
    an optical switch element disposed between said incident surface and said light source, and configured for selectively establishing said light path.

12. The device as claimed in claim 11, wherein said functional module is a flash module having a lens disposed near said light source and located in said light path.

13. The device as claimed in claim 11, wherein said optical switch element comprises a rotatable reflector.

14. The device as claimed in claim 11, wherein said optical switch element comprises a transflective member.

15. A backlight module, comprising:
    a light guide plate having an incident surface;
    a light source facing toward the incident surface;
    a light source cover partially covering the light source, a wall of the light source cover defining a light transmissive portion located between the light source and the incident surface; and
    an optical switch element disposed between the light source and the incident surface, the optical switch element being rotatable and thereby selectably allowing light beams emitted from the light source to transmit through at least one of the incident surface and the light transmissive portion.

16. The backlight module as claimed in claim 15, wherein the optical switch comprises a rotation device and a total reflection plate, and the rotation device is configured for rotating the total reflection plate to allow the light beams emitted from the light source to transmit through one of the incident surface and the light transmissive portion.

17. The backlight module as claimed in claim 16, wherein the rotation device includes a rotation axle, and the total reflection plate is fixed on the rotation axle.

18. The backlight module as claimed in claim 15, wherein the light transmissive portion comprises an opening or a lens.

19. The backlight module as claimed in claim 1, wherein the light guide plate farther has an emitting surface substantially perpendicular to the incident surface, and the wall of the light source cover is substantially perpendicular to the incident surface and supported on the emitting surface.

* * * * *